(12) United States Patent
Zhang et al.

(10) Patent No.: US 12,189,132 B2
(45) Date of Patent: Jan. 7, 2025

(54) WEARABLE DEVICE AND SMART DEVICE

(71) Applicant: GoerTek Technology Co., Ltd., Shandong (CN)

(72) Inventors: Feng Zhang, Shandong (CN); Yang Wang, Shandong (CN); Haijun Yin, Shandong (CN); Yang Yu, Shandong (CN)

(73) Assignee: Goertek Technology Co., Ltd., Shandong (CN)

( * ) Notice: Subject to any disclaimer, the term of this patent is extended or adjusted under 35 U.S.C. 154(b) by 0 days.

(21) Appl. No.: 18/292,442

(22) PCT Filed: Jul. 21, 2022

(86) PCT No.: PCT/CN2022/107065
§ 371 (c)(1),
(2) Date: Jan. 26, 2024

(87) PCT Pub. No.: WO2023/005794
PCT Pub. Date: Feb. 2, 2023

(65) Prior Publication Data
US 2024/0345404 A1 Oct. 17, 2024

(30) Foreign Application Priority Data

Jul. 26, 2021 (CN) .......................... 202110848865.3

(51) Int. Cl.
*G02B 27/01* (2006.01)
*F16H 1/16* (2006.01)

(52) U.S. Cl.
CPC .......... *G02B 27/0176* (2013.01); *F16H 1/16* (2013.01)

(58) Field of Classification Search
CPC ........ G02B 2027/0178; G02B 27/0176; G02B 7/002; A42B 3/145; A42B 3/324;
(Continued)

(56) References Cited

U.S. PATENT DOCUMENTS

2019/0227329 A1* 7/2019 Han .................... G02B 27/0179
2020/0121017 A1* 4/2020 King ........................ A42B 3/14
(Continued)

FOREIGN PATENT DOCUMENTS

CN      203570876 U   *   4/2014
CN      109480806 A   *   3/2019
(Continued)

*Primary Examiner* — Temesghen Ghebretinsae
*Assistant Examiner* — Ivelisse Martinez Quiles
(74) *Attorney, Agent, or Firm* — Baker Botts LLP

(57) ABSTRACT

A wearable device includes a main structure, two straps, a connecting piece and a driving structure. The two straps are respectively connected to two ends of the main structure; the connecting piece is provided with a mounting cavity, a slide cavity in communication with the mounting cavity, and two communicating ports, each of the two straps having one end thereof distal to the main structure movably passing through one of the communicating ports to extend into the slide cavity, and the main structure, the two straps and the connecting piece enclosing a wearable space: the driving assembly is provided in the mounting cavity, the two transmission parts being provided spaced apart in the slide cavity and in transmission connection with the driving assembly, each of the two transmission parts being in respective transmission connection with the two straps.

10 Claims, 3 Drawing Sheets

(58) Field of Classification Search
CPC .. H05K 5/0217; H05K 5/0017; H04N 13/344; H04N 2213/001; H04N 2213/008
See application file for complete search history.

(56) References Cited

U.S. PATENT DOCUMENTS

| | | | |
|---|---|---|---|
| 2020/0213708 A1* | 7/2020 | Wang | H04R 1/1066 |
| 2021/0259344 A1* | 8/2021 | Manni | A42B 1/22 |
| 2021/0381639 A1* | 12/2021 | Howard | F16M 13/04 |
| 2022/0276497 A1* | 9/2022 | Zhan | A44C 5/2071 |
| 2022/0404627 A1* | 12/2022 | Weiss | A42B 3/145 |

FOREIGN PATENT DOCUMENTS

| | | | | |
|---|---|---|---|---|
| CN | 111381373 A | * | 7/2020 | ......... G02B 27/0176 |
| CN | 113568173 A | * | 10/2021 | |

* cited by examiner

WEARABLE DEVICE AND SMART DEVICE

CROSS-REFERENCE TO RELATED APPLICATIONS

The present disclosure is a National Stage of International Application No. PCT/CN2022/107065, filed on Jul. 21, 2022, which claims priority to a Chinese patent application No. CN 202110848865.3 filed on Jul. 26, 2021 and entitled "AN ELECTRIC ADJUSTMENT METHOD OF A STRAP FOR HEAD-MOUNTED SMART GLASSES", both of which are hereby incorporated by reference in their entireties.

TECHNICAL FIELD

The present disclosure relates to the field of a smart wearable device, particularly to a wearable device and a smart device to which the wearable device is applied.

BACKGROUND

Wearable devices are portable devices that can be worn directly on the human body or integrated into the user's clothing or accessories. Wearable devices are not only hardware devices, but also capable of implementing powerful functions through software support, data interaction, and cloud interaction. The wearable devices have brought a great change to our lives and perceptions.

The wearable devices are mostly in the form of portable accessories, which have some computing functions and can be connected to mobile phones and various terminals. Mainstream product forms of wearable devices include wrist-supported bracelet-type classes (including products such as watches and wristbands), foot-supported shoes classes (including shoes, socks, or other leg-wearing products in the future), head-supported eye classes (including eyeglasses, helmets, headbands, etc.), and various types of non-mainstream product forms such as smart garments, schoolbags, crutches, and accessories.

Currently, there are two main types of wearable devices, such as head-mounted smart glasses, one of which only includes eyeglass frames and eyeglass legs lapped on the bridge of the nose and ears to match with the human body, and the other of which is fixed to the head by means of a bandage that wraps around the head. In the related art, in order to adapt to head shapes of different people, a manual adjusting mechanism is generally provided to adjust the tightness of the head strap, which increases the amount of operation of the user and is not intelligent and convenient enough.

SUMMARY

A main objective of the present disclosure is to provide a wearable device and a smart device, which aims to provide a wearable device that can automatically adjust tightness thereof, making the wearable device more intelligent and convenient.

To achieve the above objective, the present application proposes a wearable device, which comprises:
a main structure;
two straps respectively connected to two ends of the main structure;
a connecting piece provided with a mounting cavity, a slide cavity in communication with the mounting cavity, and two communicating ports, the two communicating ports being in communication with the slide cavity and located at two ends of the slide cavity, each of the two straps having one end thereof distant to the main structure movably passing through one of the communicating ports to extend into the slide cavity, and the main structure, the two straps and the connecting piece enclosing a wearable space; and
a driving structure comprising a driving assembly and two transmission parts, the driving assembly being provided in the mounting cavity, the two transmission parts being provided spaced apart in the slide cavity and in transmission connection with the driving assembly, each of the two transmission parts being in respective transmission connection with the two straps;
wherein, the driving assembly drives the two transmission parts to move the two straps along the slide cavity to adjust a size of the wearable space.

In one embodiment, the driving assembly comprises:
an actuator provided in the mounting cavity; and
a driving gear connected to an output shaft of the actuator and provided with driving teeth, each of the two transmission parts being meshed with the driving teeth.

In one embodiment, the driving structure further comprises a clutch structure provided between the actuator and the driving gear, and the clutch structure comprises:
a cam provided on the output shaft of the actuator, the driving gear being connected to a side of the cam facing away from the actuator; and
an elastic part sleeved on the output shaft of the actuator, two ends of the elastic part being elastically abutted against the cam and the actuator respectively.

In one embodiment, a side of the cam facing the driving gear is provided with a clamping bulge, a side of the driving gear facing away from the driving teeth is provided with a clamping slot, and the clamping bulge is clamped in the clamping slot.

In one embodiment, the elastic part is a spring; and/or
the clutch structure further comprises a connecting base movably connected to a side of the cam facing away from the driving gear, and the two ends of the elastic part are elastically abutted against the connecting base and the actuator respectively.

In one embodiment, the driving assembly further comprises a mounting rack provided in the mounting cavity, and the mounting rack is provided with a mounting slot in which the actuator is provided; and/or
the actuator comprises a drive motor provided in the mounting cavity and a gearbox connected to the drive motor, an output shaft of the drive motor passing through the gearbox and being connected to the cam.

In one embodiment, each of the transmission parts comprises a worm and a transmission gear provided at one end of the worm, the transmission gear being meshed with the driving teeth, and one end of the worm distant to the transmission gear being in transmission connection with the strap.

In one embodiment, one end of the worm distant to the transmission gear is provided with spiral teeth which are spirally arranged along an axial direction of the worm, and one end of each of the straps distant to the main structure is provided with a toothed rack meshed with the spiral teeth.

In one embodiment, the two transmission parts are arranged spaced apart along an extension direction of the slide cavity, and one end of each of the two transmission parts facing the other transmission part is in transmission connection with the driving assembly.

The present application also proposes a smart device comprising a terminal and the above wearable device, the wearable device being in signal connection with the terminal.

In the wearable device of technical solutions of the present disclosure, by providing the mounting cavity, the slide cavity in communication with the mounting cavity and the two communicating ports in the connecting piece, one end of the strap is connected to the main structure, and the other end of the strap movably passes through the communicating ports to extend into the slide cavity, such that the main structure, the two straps and the connecting piece enclose the wearable space, the driving assembly of the driving structure is provided in the mounting cavity of the connecting piece, and the two transmission parts of the driving structure are provided spaced apart in the slide cavity, such that the driving assembly is in respective transmission connection to the two straps in the slide cavity through two transmission parts, and thus the driving assembly drives the two transmission parts to move the two straps along the slide cavity to adjust the size of the wearable space. In this way, the tightness of the wearable space of the wearable device can be automatically adjusted, making the wearable device more intelligent and convenient.

BRIEF DESCRIPTION OF THE DRAWINGS

In order to clearly illustrate embodiments of the present application or technical solutions in the prior art, accompanying drawings that need to be used in description of the embodiments or the prior art will be briefly introduced as follows. Obviously, drawings in following description are only the embodiments of the present application. For those skilled in the art, other drawings can also be obtained according to the disclosed drawings without creative efforts.

FIG. 6 is a schematic structural illustration of a part of a driving structure according to an embodiment of the present disclosure.

DESCRIPTION OF REFERENCE SIGNS

Figure 1:
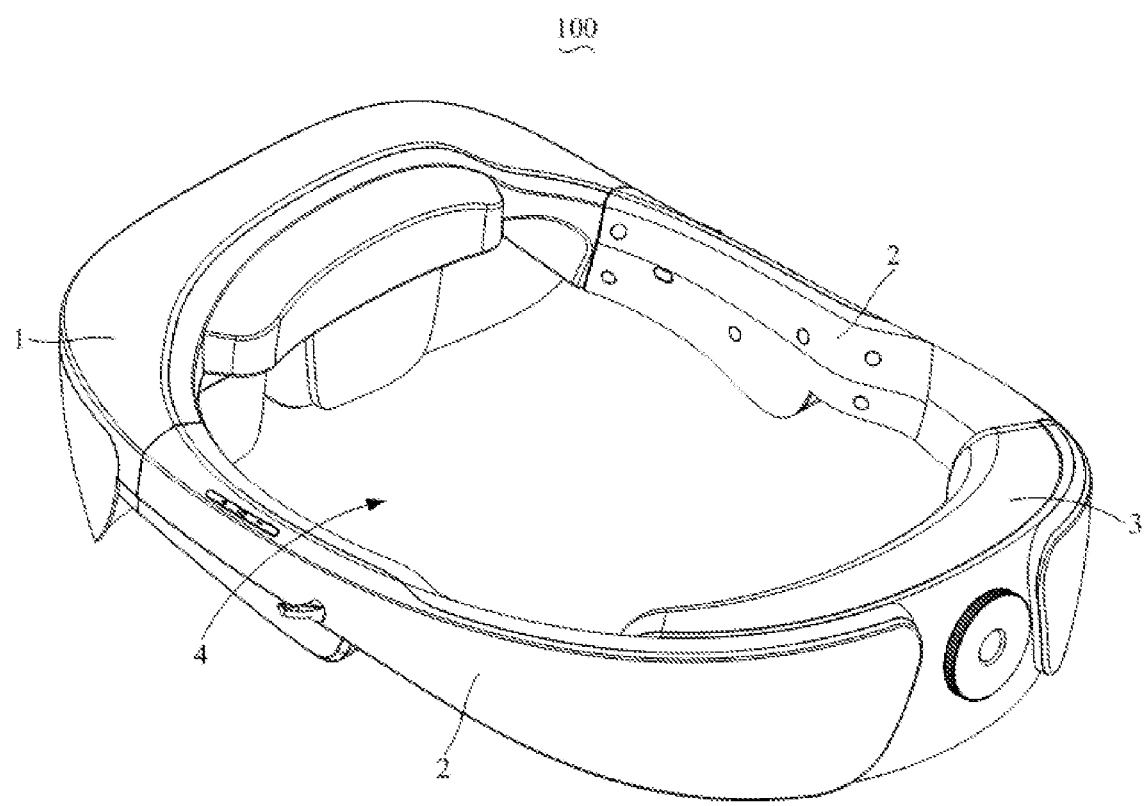
FIG. 1 is a schematic structural illustration of a wearable device according to an embodiment of the present disclosure.

| No. | Name | No. | Name |
| --- | --- | --- | --- |
| 100 | wearable device | 513 | gearbox |
| 1 | main structure | 514 | driving gear |
| 2 | strap | 515 | driving teeth |
| 21 | toothed rack | 516 | clamping slot |
| 3 | connecting piece | 52 | transmission part |
| 31 | mounting cavity | 521 | worm |
| 32 | slide cavity | 522 | transmission gear |
| 33 | communicating port | 523 | spiral teeth |
| 4 | wearable space | 53 | clutch structure |
| 5 | driving structure | 531 | cam |
| 51 | driving assembly | 532 | clamping bulge |
| 511 | actuator | 533 | elastic part |
| 512 | drive motor | 54 | mounting rack |

The implementation of the objects, functional features and advantages of the present disclosure will be further described in connection with the embodiments, with reference to the accompanying drawings.

Detailed Description

Technical solutions in the embodiments of the present disclosure are described below with reference to the accompanying drawings in the embodiments of the present disclosure. Apparently, the described embodiments are merely some of rather than all of the embodiments of the present disclosure. All other embodiments, acquired by those of ordinary skill in the art based on the embodiments of the present disclosure without any creative work, should fall into the protection scope of the present disclosure.

It should be noted that all directional indications (such as up, down, left, right, front, back . . . ) in the embodiment of the present application are used only to explain the relative positional relationship, movement, etc., between the parts in a particular attitude (as shown in the accompanying drawings), and the directional indications are changed accordingly if that particular attitude is changed.

At the same time, the meaning of "as well as/or" or "and/or" appearing in the full text is to include three schemes, taking "A and/or B" as an example, including scheme A, or scheme B, or schemes that A and B meet at the same time.

In addition, terms "first" and "second" involved in the present application are only used for descriptive purposes and should not be understood as indicating or implying relative importance or implying a number of indicated technical features. Therefore, a feature delimited with "first", "second" may expressly or implicitly include at least one of those features. In addition, the technical solutions between the various embodiments may be combined with each other, but it must be on the basis that it can be realized by a person of ordinary skill in the art, and when the combination of technical solutions appears to be contradictory or unattainable, it should be considered that such combination of technical solutions does not exist and is not within the scope of protection claimed in the present application.

Wearable devices are portable devices that can be worn directly on the body or integrated into the user's clothing or accessories. The wearable devices are not only hardware devices, but also capable of achieving powerful functions through software support, data interaction, and cloud interaction. The wearable devices have brought a great change to our lives and perceptions.

The wearable devices are mostly in the form of portable accessories, which have some computing functions and can be connected to mobile phones and various terminals. Mainstream product forms include wrist-supported bracelet-type classes (including products such as watches and wristbands), foot-supported shoes classes (including shoes, socks, or other leg-wearing products in the future), head-supported eye classes (including eyeglasses, helmets, headbands, etc.), and various types of non-mainstream product forms such as smart garments, schoolbags, crutches, and accessories.

Currently, there are two main types of wearable devices, such as head-mounted smart glasses, one of which only includes eyeglass frames and eyeglass legs lapped on the bridge of the nose and ears to match with the human body, and the other of which is fixed to the head in the form of a bandage that wraps around the head. In the related art, in order to adapt to the head shapes of different people, a manual adjusting mechanism is generally provided to adjust the tightness of the head strap, which increases the amount of operation of the user and is not intelligent and convenient enough.

Based on the above ideas and problems, the present disclosure proposes a wearable device 100, which may be head-supported eye classes, such as smart glasses, smart helmets, smart headbands, etc., and is not limited herein. It can be understood that the wearable device 100 can be applied to a smart device, so that the wearable device 100 is connected to a terminal of the smart device, thereby improving the user experience.

Referring to FIGS. 1-6, in an embodiment of the present disclosure, the wearable device 100 comprises a main structure 1, two straps 2, a connecting piece 3, and a driving structure 5, wherein two straps 2 are respectively connected to two ends of the main structure 1: the connecting piece 3 is provided with a mounting cavity 31, a slide cavity 32 in communication with the mounting cavity 31, and two communicating port 33, the two communicating ports 33 are in communication with the slide cavity 32 and located at two ends of the slide cavity 32, each of the two straps 2 having one end thereof distant to the main structure 1 movably passing through one of the communicating ports 33 to extend into the slide cavity 32, and the main structure 1, the two straps 2 and the connecting piece 3 enclosing a wearable space 4: the driving structure 5 comprises a driving assembly 51 and two transmission parts 52, the driving assembly 51 being provided in the mounting cavity 31, and the two transmission parts 52 being provided spaced apart in the slide cavity 32, are in transmission connection with the driving assembly 51, and each of the two transmission parts 52 is in respective transmission connection to the two straps: wherein, the driving assembly 51 drives the two transmission parts 52 to move the two straps 2 along the slide cavity 32 to adjust a size of the wearable space 4.

In the present embodiment, the main structure 1 of the wearable device 100 may be a structure in which electronic components such as a motherboard, an optical machine, a microphone, a speaker, a button, a battery, and an antenna are integrated, that is, the wearable device 100 is in signal connection with a terminal of the smart device via the main structure 1. It can be understood that, in order to make the user more comfortable when wearing the wearable device 100, the main structure 1 is further provided with a flexible cushion, so that the main structure 1 is in contact with the body part of the user through the flexible cushion, thus utilizing the flexible cushion for cushioning.

It can be understood that, by connecting the straps 2 at the ends of the main structure 1 and connecting the two straps 2 via the connecting piece 3, the two straps 2 and the connecting piece 3 cooperate to form the connecting structure, so that the main structure 1, the two straps 2, and the connecting piece 3 enclose a wearable space 4, so as to facilitate the user to wear through the wearable space 4.

In the present embodiment, as shown in FIG. 1, the connecting piece 3 is connected between the two straps 2, and the main structure 1 is connected between the two straps 2, such that the connecting piece 3, the two straps 2, and the main structure 1 enclose the wearable space 4. In this way, it can be understood that when the connecting piece 3 adjusts the two straps 2 through the driving structure 5, the synchronous adjustment may be realized, so as to prevent the wearing experience of the user from being degraded due to uneven stress on both sides of the main structure 1.

It can be understood that the strap 2 may be fixedly connected to the main structure 1, and may be provided with electronic components such as a battery, a speaker, a button, a battery, an antenna and the like inside. Of course, the strap 2 and the main structure 1 may also be set to rotate a certain angle so as to be suitable for different users. The connecting piece 3 and the strap 2 are set to be movably connected, so as to realize the telescopic movement, and electronic components such as a battery, a speaker, a button, a battery, an antenna and the like may also be provided in the connecting piece 3, which is not limited herein. For protection when worn by the user, the connecting piece 3 and/or the strap 2 of the connecting structure is provided with a soft cushion for cushioning.

In the present embodiment, as shown in FIGS. 2-5, the connecting piece 3 is provided with the mounting cavity 31, the slide cavity 32 in communication with the mounting cavity 31, and the two communicating port 33. That is, the two communicating ports 33 are located at both ends of the slide cavity 32 in the extending direction, and the mounting cavity 31 is in communication with the slide cavity 32 located between the two communicating ports 33, which makes it convenient for the driving assembly 51 of the driving structure 5 to be provided in the mounting cavity 31 without affecting the movement of the strap 2 in the slide cavity 32. At the same time, the two transmission parts 52 of the driving structure 5 are provided spaced apart in the slide cavity 32, are in transmission connection with the driving assembly 51, and are in transmission connection with the two straps 2 respectively. In this way, the driving assembly 51 provides a driving force and distributes the driving force to the two straps 2 through the two transmission parts 52, so that the two straps 2 is synchronously driven to move along the slide cavity 32 to adjust the size of the wearable space 4.

It can be understood that one end of each of the two straps 2 distant to the main structure 1 movably passes through one of the communicating ports 33 to extend into the slide cavity 32, and is in transmission connection with one of the transmission parts 52. The mounting cavity 31 of the connecting piece 3 is used for mounting and protecting the driving assembly 51 of the driving structure 5, and also prevents the driving assembly 51 from being exposed, thereby improving the aesthetic appearance of the wearable device 100. The communicating port 33 and the slide cavity 32 of the connecting piece 3 are used to facilitate the end of the strap 2 distant to the main structure 1 to be movably connected to the connecting piece 3 and to extend into the slide cavity 32 through the communicating port 33 to be in transmission connection with the transmission part 52. That is, the slide cavity 32 and communicating port 33 of connecting piece 3 are used to provide contraction space for strap 2, and to install and protect the transmission parts 52 of the driving structure 5.

As shown in FIGS. 2-5, in one embodiment, the two transmission parts 52 are arranged spaced apart along an extension direction of the slide cavity 32, and ends of the two transmission parts 52 facing each other are in transmission connection with the driving assembly 51. It can be understood that with above configuration, ends of the two straps 2 distant to the main structure 1 extend into the slide cavity 32 from both ends of the slide cavity 32, and with the two transmission parts 52 arranged spaced apart along the extension direction of the slide cavity 32, the two straps 2 and the two transmission parts 52 are located on the same line or plane along the extension direction of the slide cavity 32. As such, when the driving assembly 51 drives the two transmission parts 52 to move the two straps 2 along the slide cavity 32 to adjust a size of the wearable space 4, the two straps 2 are stressed on the same circumference of the wearable space 4 to improve the user's experience.

It can be understood that the driving assembly 51 of the driving structure 5 may be a driving cylinder, an automatic telescopic rod structure, a motor-compatible screw structure, a motor-compatible gear structure, or a motor-compatible pulley structure, and so on, as long as it is a structure that is able to drive two straps 2 to move along the slide cavity 32 to adjust the size of the wearable space 4, which is not limited herein. Optionally, the transmission part 52 can be a transmission gear, a transmission chain, a transmission screw, or a transmission belt, which is not limited herein.

In the wearable device 100 of the present disclosure, by providing the mounting cavity 31, the slide cavity 32 in communication with the mounting cavity 31 and the two communicating ports 33 in the connecting piece 3, one end of the strap 2 is connected to the main structure 1, and the other end of the strap 2 movably passes through the communicating ports 33 to extend into the slide cavity 32, such that the main structure 1, the two straps 2 and the connecting piece 3 enclose the wearable space 4, the driving assembly 51 of the driving structure 5 is provided in the mounting cavity 31 of the connecting piece 3, and the two transmission parts 52 of the driving structure 5 are provided spaced apart in the slide cavity 32, such that the driving assembly 51 is in respective transmission connection to the two straps 2 in the slide cavity 32 through two transmission parts 52, and thus the driving assembly 51 drives the two transmission parts 52 to move the two straps 2 along the slide cavity 32 to adjust the size of the wearable space 4. In this way, the tightness of the wearable space 4 of the wearable device 100 can be automatically adjusted, making the wearable device 100 more intelligent and convenient.

In one embodiment, the driving assembly 51 comprises an actuator 511 and a driving gear 514, wherein the actuator 511 is provided in the mounting cavity 31, the driving gear 514 is connected to an output shaft of the actuator 511 and is provided with driving teeth 515, and each of the two transmission parts 52 is meshed with the driving teeth 515.

As shown in FIGS. 2-4 and FIG. 6, by configuring the driving assembly 51 with the actuator 511 and the driving gear 514 such that the driving teeth 515 of the driving gear 514 is meshed with the two transmission parts 52, one actuator 511 can simultaneously drive the two transmission parts 52 and drive two straps 2 to move.

It can be understood that the actuator 511 may optionally be a structure such as a drive motor or a drive motor, and is in transmission connection with the transmission part 52 via the driving teeth 515 of the driving gear 514, thereby driving the strap 2 to via the transmission part 52.

Figure 4:
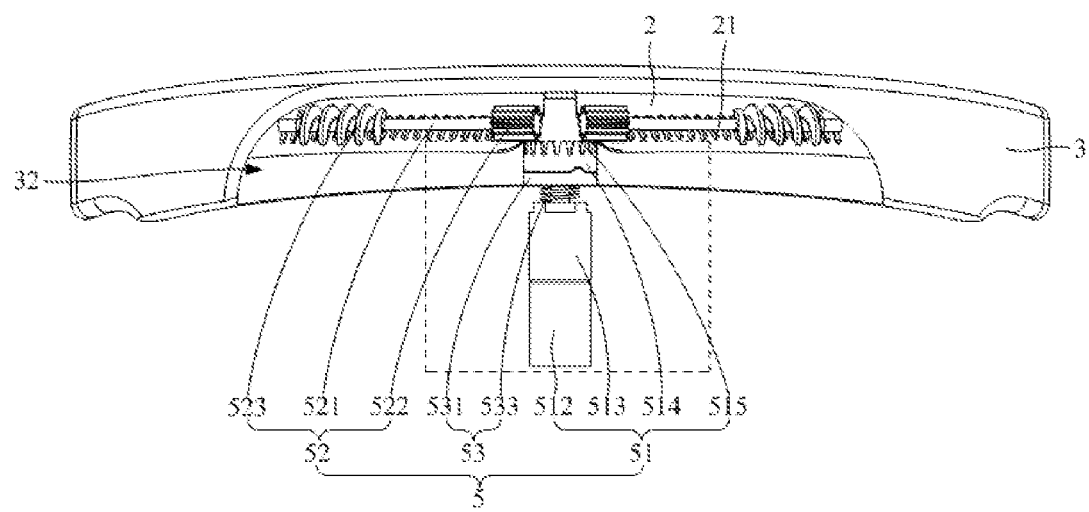
FIG. 4 is a schematic structural illustration of a portion of the wearable device in another embodiment of the present disclosure.
Figure 5:
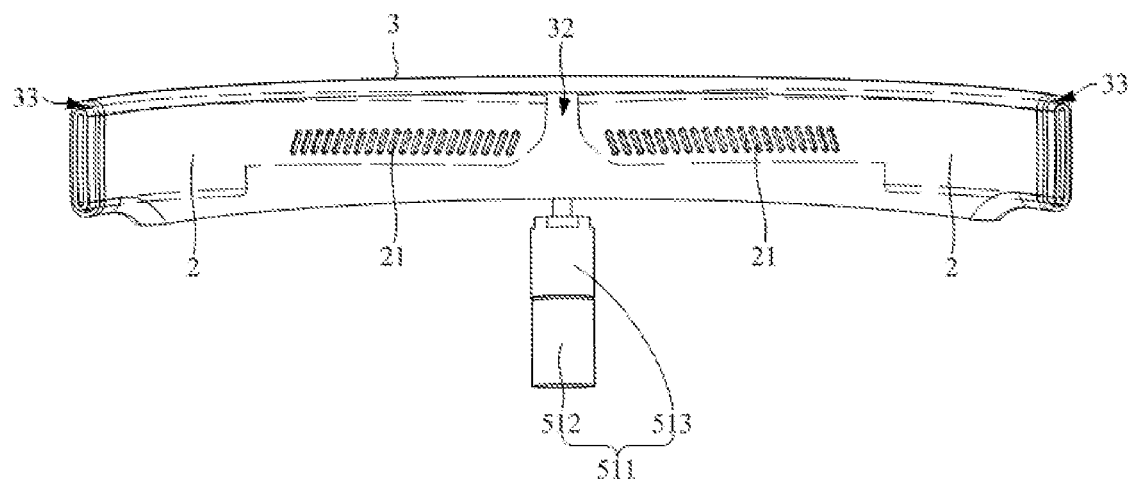
FIG. 5 is a schematic structural illustration of a part of a connecting piece and the strap according to an embodiment of the present disclosure.

In one embodiment, as shown in FIGS. 4-6, the actuator 511 comprises a drive motor 512 provided in the mounting cavity 31 and a gearbox 513 connected to the drive motor 512, an output shaft of the drive motor 512 passing through the gearbox 513 and being connected to the driving gear 514. It can be understood that with the above configuration, the gearbox 513 may be used to decelerate the rotation of the drive motor 512 to protect the driving gear 514.

In one embodiment, the driving structure 5 further comprises a clutch structure 53 provided between the actuator 511 and the driving gear 514, and the clutch structure 53 comprises a cam 531 and an elastic part 533. The cam 531 is provided on the output shaft of the actuator 511, and the driving gear 514 is connected to a side of the cam 531 facing away from the actuator 511. The elastic part 533 is sleeved on the output shaft of the actuator 511, and two ends of the elastic part 533 is elastically abutted against the cam 531 and the actuator 511 respectively.

As shown in FIGS. 4 and 6, by providing the clutch structure 53 between the actuator 511 and the driving gear 514, the cam 531 is torsionally driven under the elastic pressure of elastic part 533 with the cooperation of the cam 531 and the elastic part 533 of the clutch structure 53. When a torque value exceeds a set limit, the elastic part 533 is reversely compressed by the cam 531, so that the transmission between the cam 531 and the driving gear 514 is disconnected, thereby protecting the straps 2 from clamping the head. Optionally, the elastic part 533 is a spring.

It can be understood that by providing the clutch structure 53, during the rotation of the driving gear 514 driven by the actuator 511 through the cam 531, it is possible to effectively prevent failures of certain control systems or mechanical failures, and when the torque provided by the actuator 511 is too high, it is possible to effectively prevent the user's head from being over-tightened due to excessive movement of the two straps 2, and also protect the straps 2 from damage due to excessive power.

In one embodiment, as shown in FIG. 6, a side of the cam 531 facing the driving gear 514 is provided with a clamping bulge 532, a side of the driving gear 514 facing away from the driving teeth 515 is provided with a clamping slot 516, and the clamping bulge 532 is clamped in the clamping slot 516.

It can be understood that the cam 531 is meshed with the driving gear 514 with the cooperation of the clamping bulge 532 and the clamping slot 516, and the clamping bulge 532 of the cam 531 is pressed against the clamping slot 516 of the driving gear 514 by the elastic pressure of the elastic part 533. When the driving gear 514 receives an excessive resistance from the transmission part 52, that is, when the wearable space 4 has been adjusted in place, if the actuator 511 continues to drive the cam 531 to rotate, the clamping bulge 532 of the cam 531 will be separated from the clamping slot 516 and compress the elastic part 533 reversely, so that the transmission force between the cam 531 and the driving gear 514 is disconnected. In this way, it is possible to effectively protect the head from being clamped by the straps 2.

In one embodiment, in order to avoid a large friction when the elastic part 533 and the bulge 532 are directly abutted, the clutch structure 53 further comprises a connecting base movably connected to a side of the cam 531 facing away from the driving gear 514, and the two ends of the elastic part 533 are elastically abutted against the connecting base and the actuator 511 respectively.

It can be understood that the connecting base may be connected to the cam 531 via the bearing part, that is, the cam 531 is rotatably provided within the connecting base, such that the two ends of the elastic part 533 are elastically abutted against the connecting base and the actuator 511 respectively. Therefore, the elastic part 533 does not have to be in direct contact with the cam 531 when compressing the cam 531 with elastic force, which reduces friction and prevents the elastic part 533 from affecting or interfering with the rotation of the cam 531. In the present embodiment, the connecting base is provided in the mounting cavity 31 of the connecting piece 3, and may not be rotated circumferentially, but may be moved axially.

Figure 2:
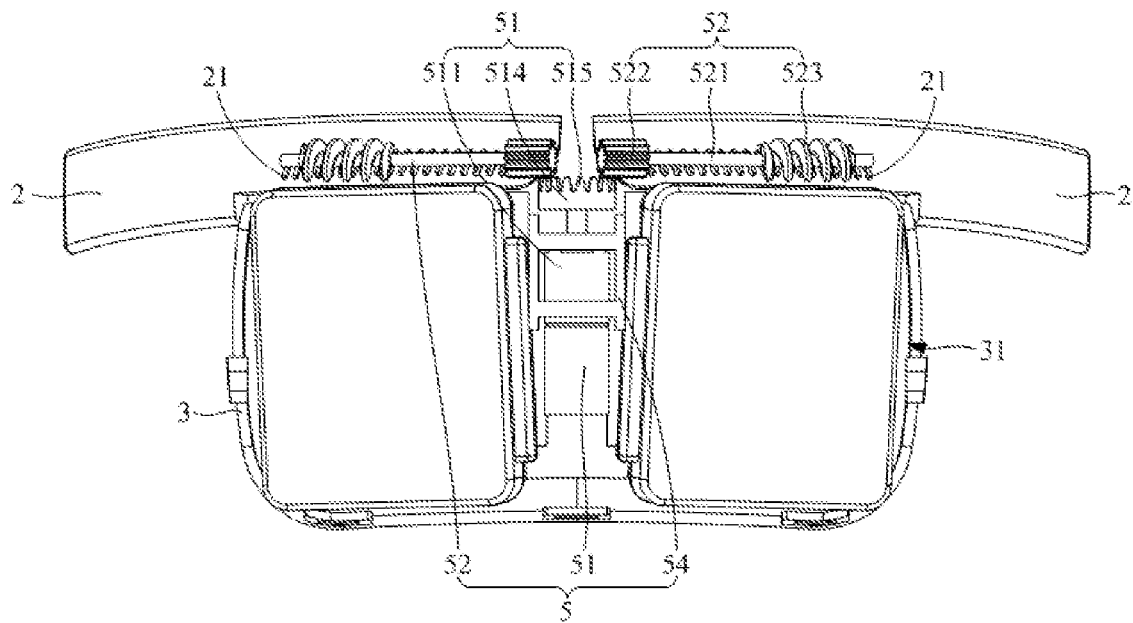
FIG. 2 is a schematic structural illustration of a portion of the wearable device when a strap is in a contracted state according to an embodiment of the present disclosure.
Figure 3:
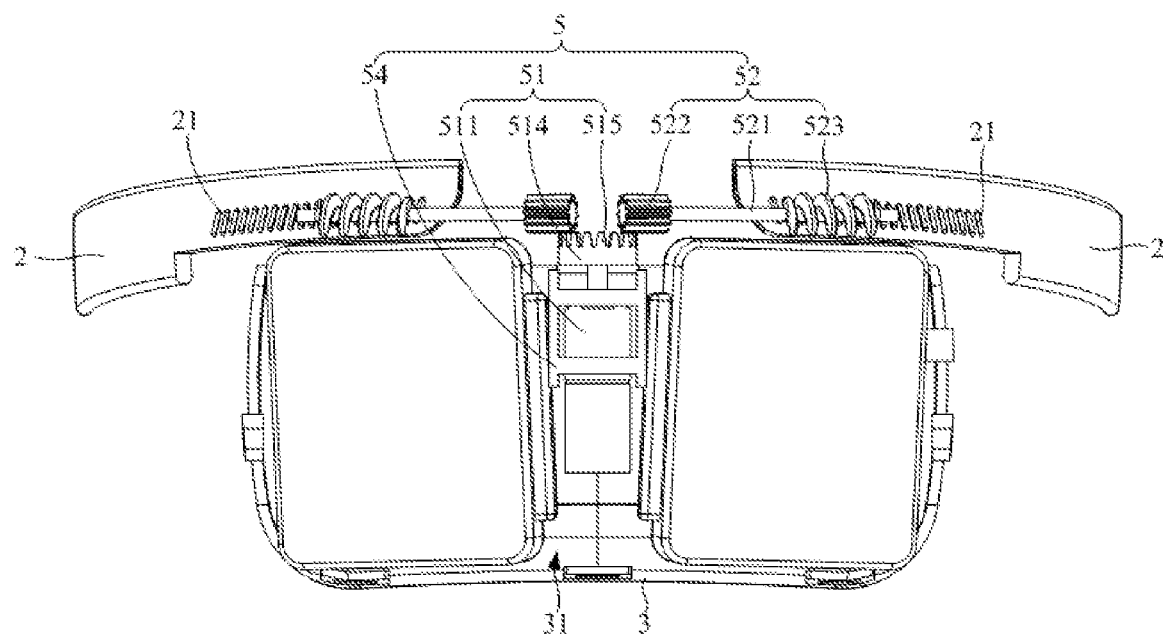
FIG. 3 is a schematic structural illustration of a portion of the wearable device when the strap is in an extended state according to an embodiment of the present disclosure.

In one embodiment, as shown in FIGS. 2 and 3, the driving assembly 51 further comprises a mounting rack 54 provided in the mounting cavity 31, and the mounting rack 54 is provided with a mounting slot in which the actuator 511 is provided.

In the present embodiment, the mounting rack 54 is used to mount and fix components such as the actuator 511 and the clutch structure 53, that is, the mounting rack 54 provides a mounting base for components such as the actuator 511 and the clutch structure 53, and the structure of the mounting rack 54 may be a mounting plate, a bracket, a mounting frame, or a mounting seat, which is not limited herein.

It can be understood that the mounting rack 54 may be integrated into the mounting cavity 31 of the connecting piece 3, which improves the connection stability between the mounting rack 54 and the connecting piece 3. Of course, in order to facilitate disassembly and assembly, the mounting rack 54 and the connecting piece 3 are set separately, that is, the mounting rack 54 may be detachably mounted in the mounting cavity 31 of the connecting piece 3 by means of a detachable connection structure such as a snap connection, a bayonet fit, a screw connection, or a pin connection, which is not limited herein.

In the present embodiment, by providing the mounting slot on the mounting rack 54, it is convenient to limit mounting of the actuator 511 and the clutch structure 53 by means of the mounting slot. It can be understood that the actuator 511 comprises the drive motor 512 provided in the mounting cavity 31 and the gearbox 513 connected to the drive motor 512, and the output shaft of the drive motor 512 passes through the gearbox 513 to be connected to the cam 531. That is, the drive motor 512 and the gearbox 513 of the actuator 511 are provided in the mounting slot of the mounting rack 54, and the connecting base of the clutch structure 53 slides against the wall of the mounting slot.

It can be understood that in order to facilitate the transmission connection between the driving gear 514 and the transmission part 52, the driving gear 514 is located in the communicating portion between the slide cavity 32 and the mounting cavity 31, or at least a portion of the driving gear 514 is located in the slide cavity 32.

In one embodiment, each of the transmission parts 52 comprises a worm 521 and a transmission gear 522 provided at one end of the worm 521, the transmission gear 522 is meshed with the driving teeth 515, and one end of the worm 521 distant to the transmission gear 522 is in transmission connection with the straps 2.

As shown in FIGS. 2-4, by configuring the transmission part 52 with the worm 521 and the transmission gear 522, the worm 521 is meshed with the driving teeth 515 of the driving gear 514 via the transmission gear 522, thereby ensuring transmission accuracy. It can be understood that the transmission gears 522 of the two transmission parts 52 are set facing each other spaced apart, and the two transmission gears 522 are both meshed with the driving teeth 515 of the driving gear 514.

In one embodiment, as shown in FIGS. 2-4, one end of the worm 521 distant to the transmission gear 522 is provided with spiral teeth 523 which are spirally arranged along an axial direction of the worm 521, and one end of each of the straps 2 distant to the main structure 1 is provided with a toothed rack 21 meshed with the spiral teeth 523.

It can be understood that by providing the toothed rack 21 at one end of the strap 2 distant to the main structure 1, the toothed rack 21 movably passes through the communicating port 33 to extend into the slide cavity 32 and is meshed with the spiral teeth 523, which simplifies the connection structure on the one hand and the driving structure 5 on the other hand. Alternatively, the toothed rack 21 may be an oblique tooth or a tooth structure provided at a side wall of the strap 2, which is not limited herein.

In the present embodiment, by providing the spiral teeth 523 of the worm 521 spirally, the spiral teeth 523 can realize the movement of the toothed rack 21, and when the actuator 511 stops working, the spiral teeth 523 of the worm 521 can realize the self-locking of the toothed rack 21.

The present disclosure also proposes a smart device comprising a terminal and the wearable device 100 being in signal connection with the terminal. For the specific structure of the wearable device 100, reference is made to the foregoing embodiments. Since the smart device adopts all the technical solutions of the foregoing embodiments, it at least has all the beneficial effects brought by the technical solutions of the foregoing embodiments, which will not be repeated herein.

Each embodiment in this specification is described in a parallel or progressive manner, and each embodiment focuses on its differences from other embodiments, and the same or similar parts between each embodiment can refer to each other. For the apparatus disclosed in the embodiments, the description is relatively simple because the apparatus corresponds to the method disclosed in the embodiments, and the relevant points can be found in the description of the method.

It will also be appreciated by one of ordinary skill in the art that the unit and algorithm step of each example described in conjunction with the embodiments disclosed herein can be realized by electronic hardware, computer software, or a combination of the two. In order to clearly illustrate the interchangeability of hardware and software, the components and steps of each example have been described in general terms by function in the above description. Whether these functions are performed in hardware or software depends on the specific application and design constraints of the technical solution. A skilled person may use a different method for each particular application to implement the described function, but such implementation shall not be considered beyond the scope of this disclosure.

The steps of the method or algorithm described in the embodiments disclosed herein can be implemented directly with hardware, software modules executed by processors, or a combination of both. The software module can be placed in random access memory (RAM), memory, read-only memory (ROM), electrically programmable ROM, electrically erasable programmable ROM, registers, hard disks, removable disks, CD-ROMs, or any other form of storage medium known in the technical field.

It should also be noted that in this article, relational terms such as first and second, etc., are used solely to distinguish one entity or operation from another, and do not necessarily require or imply any such actual relationship or sequence between those entities or operations. Further, the term "comprise", "include" or any other variation thereof is intended to cover non-exclusive comprising so that a process, method, article or apparatus that comprises a series of elements includes not only those elements, but also other elements that are not expressly listed, or also comprises elements inherent in such process, method, article or apparatus. Without further limitation, the elements defined by the phrase "comprising a . . ." do not preclude the existence of other identical elements in the process, method, article or apparatus that includes the elements.

The invention claimed is:

1. A wearable device, comprising:
a main structure;
two straps respectively connected to two ends of the main structure;
a connecting piece provided with a mounting cavity, a slide cavity in communication with the mounting cavity, and two communicating ports adapted for communication with the slide cavity and located at two ends of the slide cavity, each of the two straps having an end thereof distal to the main structure and movably passing through one of the communicating ports to extend into the slide cavity, such that the main structure, the two straps, and the connecting piece enclose a wearable space having a size; and
a driving structure comprising a driving assembly and two transmission parts, the driving assembly being provided in the mounting cavity, the two transmission parts being spaced apart from each other in the slide cavity and in transmission connection with the driving assembly, each of the two transmission parts being in respective transmission connection with each of the two straps;
wherein, the driving assembly is adapted to drives the two transmission parts to move the two straps along the slide cavity to adjust the size of the wearable space.

2. The wearable device according to claim 1, wherein the driving assembly comprises:
an actuator provided in the mounting cavity; and
a driving gear connected to an output shaft of the actuator and provided with driving teeth, each of the two transmission parts being meshed with the driving teeth.

3. The wearable device according to claim 2, wherein the driving structure further comprises a clutch structure provided between the actuator and the driving gear, the clutch structure comprising:
a cam provided on the output shaft of the actuator, the driving gear being connected to a side of the cam facing away from the actuator; and
an elastic part sleeved on the output shaft of the actuator, two ends of the elastic part being elastically abutted against the cam and the actuator respectively.

4. The wearable device according to claim 3, wherein a side of the cam facing the driving gear is provided with a clamping bulge, a side of the driving gear facing away from the driving teeth is provided with a clamping slot, and the clamping bulge is clamped in the clamping slot.

5. The wearable device according to claim 3, wherein the elastic part includes a spring; and/or
the clutch structure further comprises a connecting base movably connected to a side of the cam facing away from the driving gear, and the two ends of the elastic part are elastically abutted against the connecting base and the actuator respectively.

6. The wearable device according to claim 3, wherein the driving assembly further comprises a mounting rack provided in the mounting cavity, and the mounting rack is provided with a mounting slot in which the actuator is provided; and/or
the actuator comprises a drive motor provided in the mounting cavity and a gearbox connected to the drive motor, an output shaft of the drive motor passing through the gearbox and being connected to the cam.

7. The wearable device according to claim 2, wherein each of the transmission parts comprises a worm and a transmission gear provided at a first end of the worm, the transmission gear being meshed with the driving teeth, and a second end of the worm distal to the transmission gear being in transmission connection with a respective one of the two straps.

8. The wearable device according to claim 7, wherein the second end of the worm distal to the transmission gear is provided with spiral teeth which are spirally arranged along an axial direction of the worm, and one end of each of the two straps distal to the main structure is provided with a toothed rack meshed with the spiral teeth.

9. The wearable device according to claim 1, wherein the two transmission parts are spaced apart from each other along an extension direction of the slide cavity, and one end of each of the two transmission parts facing the other transmission part is in transmission connection with the driving assembly.

10. A smart device, comprising:
a terminal; and
a wearable device according to claim 1, the wearable device being in signal connection with the terminal.

* * * * *